United States Patent
Sullivan et al.

(10) Patent No.: US 6,416,868 B1
(45) Date of Patent: Jul. 9, 2002

(54) ALKALINE EARTH-MANGANESE OXIDE PIGMENTS

(75) Inventors: Robert Michael Sullivan, Washington; Terry James Detrie, Bridgeville; Daniel Russell Swiler, Washington, all of PA (US)

(73) Assignee: DMC2 Degussa Metals Catalysts Cerdec AG, Frankfurt (DE)

(*) Notice: Subject to any disclaimer, the term of this patent is extended or adjusted under 35 U.S.C. 154(b) by 0 days.

(21) Appl. No.: 09/449,605

(22) Filed: Nov. 23, 1999

(51) Int. Cl.[7] .............................. B32B 9/00; C09D 11/00
(52) U.S. Cl. ....................... 428/432; 428/440; 428/467; 428/469; 428/701; 428/702; 428/697; 428/699; 106/31.9; 106/461; 106/464; 106/465; 106/471
(58) Field of Search .................. 106/444, 449, 106/461, 464, 465, 470, 471, 31.9; 428/432, 440, 469, 702, 697, 699, 701, 467

(56) References Cited

U.S. PATENT DOCUMENTS

| | | | |
|---|---|---|---|
| 3,531,391 A | * | 9/1970 | Palaika |
| 3,819,252 A | * | 6/1974 | Giglia |
| 3,874,883 A | | 4/1975 | Robitaille et al. |
| 4,156,613 A | | 5/1979 | Hund et al. |
| 4,388,118 A | | 6/1983 | Eppler |
| 4,469,521 A | * | 9/1984 | Salensky |
| 4,710,404 A | * | 12/1987 | Reichert et al. |
| 5,006,175 A | | 4/1991 | Modly |
| 5,080,718 A | | 1/1992 | Sullivan et al. |
| 5,164,005 A | | 11/1992 | Kuske et al. |
| 5,250,112 A | | 10/1993 | Wussow et al. |
| 5,269,841 A | | 12/1993 | Kuske et al. |
| 5,611,852 A | * | 3/1997 | Phaff et al. |
| 6,171,383 B1 | * | 1/2001 | Sakoske et al. |

* cited by examiner

*Primary Examiner*—Deborah Jones
*Assistant Examiner*—Jennifer McNeil
(74) *Attorney, Agent, or Firm*—Alan G. Towner; Daniel P. Cillo; Eckert Seamans Cherin & Mellott, LLC (57) ABSTRACT

Alkaline earth-manganese oxides are used as pigments. The alkaline earth-manganese oxide pigments are preferably of the formula $Me_xMnO_y$, where Me is at least one metal selected from Ca, Sr, Ba and Mg, x is from 0.01 to 99, and y is greater than or equal to x+1 and less than or equal to x+2. The pigments are useful as colorants, and also possess improved reflectance characteristics, particularly in the IR region, and may reduce IR-induced heat buildup. These colorants can be used to form colored objects, or coat objects when they are either added into or applied onto materials such as paints, inks, plastics, glasses, ceramics and the like. The patent also covers the production of these pigments.

13 Claims, 8 Drawing Sheets

FIG. 8 ly, x ranges from 0.08 to 12, more preferably from 0.25 to 4, and y ranges from x+1 to x+2. These pigments can be used to color objects, or coat objects by their use in applications such as paints, inks, plastics, glasses, ceramics and the like. The invention also includes the production of these pigments, substitution of other elements into these pigments, and the use of protective coatings on these pigments in order to enhance their properties.

ALKALINE EARTH-MANGANESE OXIDE PIGMENTS

FIELD OF THE INVENTION

The present invention relates to pigments for plastics, glasses, ceramics, paints, enamels, inks and other types of materials, and more particularly relates to the use of alkaline earth-manganese oxide compositions as pigments for use in plastics, paints, coatings, glass enamels and other materials.

BACKGROUND INFORMATION

Pigments are widely used in various applications such as paints, inks, plastics, rubbers, ceramics, enamels and glasses. There are various reasons for using inorganic pigments. Among these are the coloristic properties of the pigments, their visible as well as ultraviolet (UV) and infrared (IR) reflectance characteristics, their light fastness and their high temperature stability, which is necessary when the objects being colored are formed at elevated temperatures. A summary of many types of inorganic pigments and some of their applications can be found in the Kirk-Othmer Encyclopedia of Chemical Technology, Fourth Edition, Volume 18.

Manganese is used as a chromophore in several mixed metal oxide pigments, which are listed in the Dry Color Manufacturers Association (DCMA) classifications. In the corrundum structure, manganese is used to form manganese alumina pink corrundum, DCMA number 3-04-5. Manganese is also used as a chromophore in the rutile structure to form brown pigments, such as manganese antimony titanium buff rutile (DCMA 11-20-6), manganese chrome antimony titanium brown rutile (DCMA 11-46-7), and manganese niobium titanium brown rutile (11-47-7). Manganese is also a component in many spinel pigments to form brown or black colors. Examples are manganese ferrite black spinel (DCMA 13-41-9), chrome iron manganese brown spinel (DCMA 13-48-7), and chrome manganese zinc brown spinel (DCMA 13-51-7).

Currently, several of the DCMA classified pigments are used due to their IR reflectance performance. The IR reflective performance is typically determined by the relative amount of reflectance provided in the solar infrared region of the spectrum, i.e., 700 to 2,500 nm in wavelength, compared to the visible region of the spectrum, i.e., 400 to 700 nm in wavelength. Common black pigments such as carbon black have low reflectances in both regions. To obtain enhanced IR reflectance, inorganic black pigments from the classification DCMA 13-50-9, chrome iron nickel black spinel, or DCMA 3-05-3, chrome green black spinel, are used for these applications. The pigment DCMA 13-30-3, cobalt chromite green spinel, also provides a higher IR reflectance than visible reflectance.

The above-mentioned pigments do not provide the desired color values, contain the desired chemistry or provide the desired infrared reflectance properties for many applications. The present invention provides pigments with enhanced color, composition and performance characteristics.

SUMMARY OF THE INVENTION

This invention relates to pigments that can be represented by the formula $Me_xMnO_y$, where Me comprises at least one metal of the alkaline earth metals Ca, Ba, Sr and Mg, x ranges from 0.01 to 99, and y designates the number of oxygen atoms required to maintain electroneutrality. Preferab In accordance with an embodiment of the present invention, one property of the alkaline earth-manganese oxide pigments is high infrared reflectance while maintaining a visibly dark color. This high infrared reflectance may result in substantially less heat buildup in colored objects using the present alkaline earth-manganese oxide pigments.

Another property of the present alkaline earth-manganese oxide pigments is their ability to change to a different color when exposed to high temperatures. For example, when surfaces containing these materials are subjected to elevated temperatures by laser marking, legible marks are obtained.

Another aspect of the present invention is to provide a coating composition including a liquid carrier and a pigment comprising alkaline earth-manganese oxide dispersed therein.

Another aspect of the present invention is to provide an article including a substrate matrix and alkaline earth-manganese oxide pigment dispersed in the matrix.

A further aspect of the present invention is to provide an article including a substrate and a coating comprising an alkaline earth-manganese oxide pigment covering at least a portion of the substrate.

Another aspect of the present invention is to provide a method of making an alkaline earth-manganese oxide pigment. One method includes the steps of mixing powders capable of yielding metal oxides, and calcining the mixture.

These and other aspects of the present invention will be more apparent from the following description.

DETAILED DESCRIPTION

This invention relates to the use of alkaline earth-manganese oxides as pigments. The alkaline earth-manganese oxide pigments are of the formula $Me_xMnO_y$, where Me is at least one alkaline earth metal selected from Ca, Sr, Ba and Mg, x ranges from 0.01 to 99, and y designates the number of oxygen atoms required to maintain electroneutrality. Preferably, x ranges from 0.08 to 12, more preferably from 0.25 to 4. The value of y is preferably greater than or equal to x+1 and less than or equal to x+2.

Alkaline earth-manganese oxide materials of the above-noted formula have been found to possess favorable colorant properties, and are useful as pigments of various colors such as black, brown, green, etc. In addition to their use as colorants, the alkaline earth-manganese oxide pigments of the invention may provide improved infrared reflectance and reduced heat buildup properties. The pigments are useful in many applications, including organic chemical compositions such as plastics, rubbers and the like, coating compositions such as paints, printing inks and the like, and inorganic chemical compositions such as glass enamels, porcelain enamels and the like.

Table 1 provides concentrations of manganese in some pigments of the formula $Me_xMnO_y$ relative to its corresponding alkaline earth metal in accordance with embodiments of the invention.

TABLE 1

Composition Ranges of Alkaline Earth Manganese Oxide Pigments

| Chemistry | Color | Preferred mol % Mn | More Preferred mol % Mn |
|---|---|---|---|
| $Ca_2MnO_y$ | Black | 10–40 | 20–33 |
| $Ca_{0.5}MnO_y$ | Brown | 60–90 | 60–70 |
| $SrMnO_y$ | Black | 45–60 | 45–55 |
| $Sr_2MnO_y$ | Green | 20–45 | 33–40 |
| $BaMnO_y$ | Brown | 45–90 | 45–60 |
| $Ba_2MnO_y$ | Green | 10–45 | 25–40 |

Figure 1:
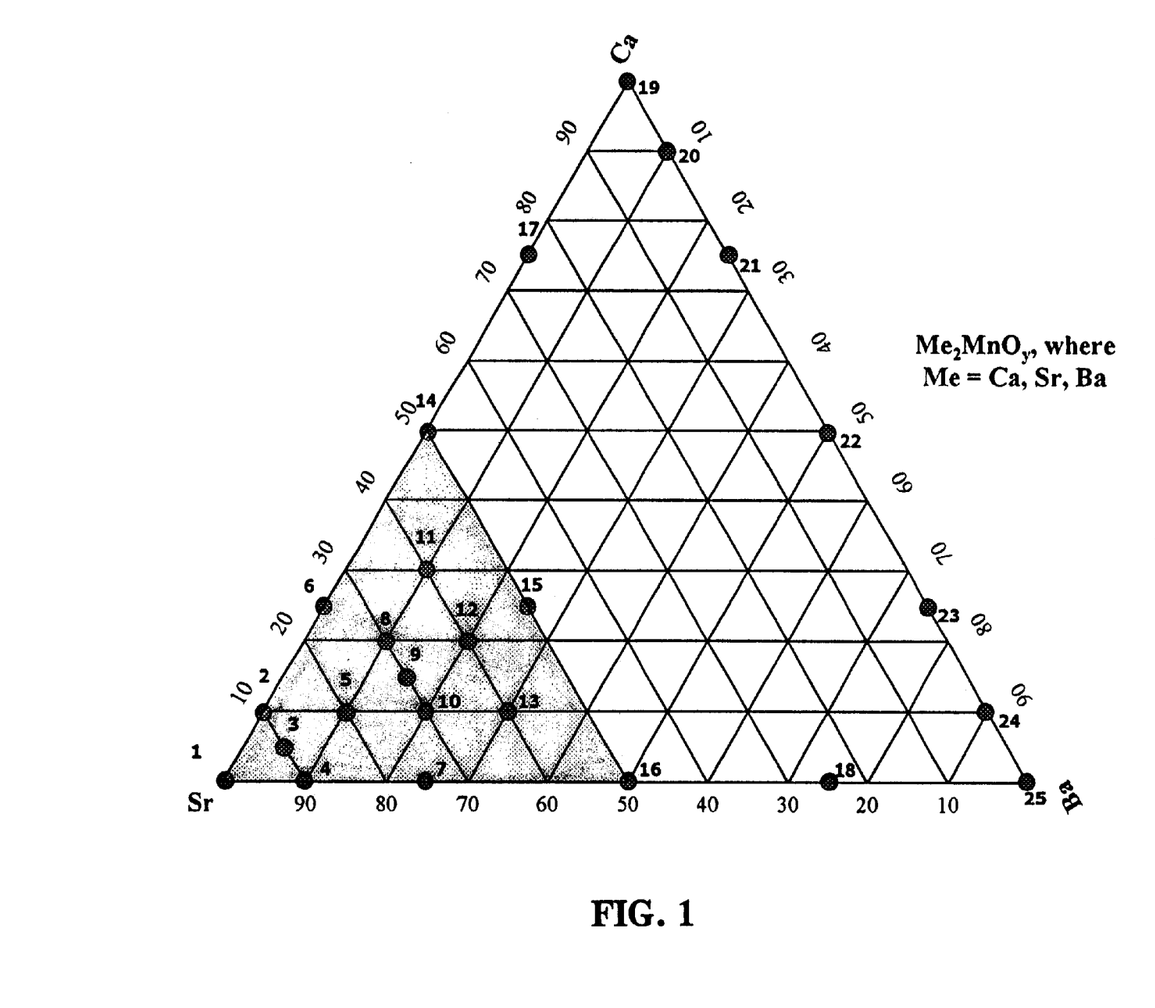
FIG. 1 is a graph illustrating the mole percentages of Ca, Sr and Ba contained in several alkaline earth-manganese oxide pigments of the formula $Me_2MnO_4$ in accordance with embodiments of the present invention.

It is also possible to produce pigments through the introduction of a second alkaline earth metal into pigments such as those listed in Table 1. In one embodiment of the invention, the alkaline earth-manganese oxide pigments comprise $Me_2MnO_4$, where Me is at least one metal selected from Ca, Sr, Ba and Mg. As an example, the $Sr_2MnO_y$ pigment can accommodate extensive amounts of both calcium and barium. FIG. 1 illustrates various mole percentages of Ca, Sr and Ba in such $Me_2MnO_4$ pigments in accordance with this embodiment. Some preferred compositions are shown by the shaded region of FIG. 1.

Table 2 lists preferred concentrations of strontium in $Me_2MnO_y$ relative to other alkaline earth metals.

TABLE 2

Composition Ranges of Alkaline Earth Metals in $(Sr,Ca,Ba)_2MnO_y$

| Chemistry | Color | mol % Sr | Preferred mol % Sr |
|---|---|---|---|
| $(Sr,Ca,Ba)_2MnO_y$ | Brown | 0–100 | 50–100 |

Color values of the pigments listed in Tables 1 and 2 are given in Table 3 (masstone polyvinyl chloride) and Table 4 (tint polyvinyl chloride). For Tables 3 through 5 below: $L^*$ is lightness on a scale of 0 (black) to 100 (white); $a^*$ indicates green (negative) or red (positive); $b^*$ indicates blue (negative) or yellow (positive); $C^*$ defines chroma ($C^* = (a^{*2}+b^{*2})^{1/2}$); and h is hue angle.

TABLE 3

Color Values (Masstone)

| Chemistry | Color | $L^*$ | $a^*$ | $b^*$ | $C^*$ | h |
|---|---|---|---|---|---|---|
| $Ca_2MnO_y$ | Black | 27.85 | 0.88 | 0.38 | 0.96 | 23.63 |
| $SrMnO_y$ | Black | 29.41 | 0.91 | −0.15 | 0.93 | 350.65 |
| $Ca_{0.5}MnO_y$ | Brown | 29.60 | 5.90 | 1.17 | 6.01 | 11.25 |
| $BaMnO_y$ | Brown | 36.58 | 3.45 | 11.85 | 12.35 | 73.75 |
| $Sr_2MnO_y$ | Green | 31.90 | −0.90 | 2.73 | 2.88 | 108.22 |
| $Ba_2MnO_y$ | Green | 31.49 | −1.12 | 5.20 | 5.32 | 102.17 |
| $(Sr,Ca,Ba)_2MnO_y$ | Green | 31.82 | −1.60 | 3.65 | 3.99 | 113.72 |

TABLE 4

Color Values (Tine, Color Matched to Equal $L^*$ value)

| Chemistry | Color | $L^*$ | $a^*$ | $b^*$ | $C^*$ | h |
|---|---|---|---|---|---|---|
| $Ca_2MnO_y$ | Black | 55.89 | 0.86 | −2.80 | 2.93 | 286.99 |
| $SrMnO_y$ | Black | 56.25 | −0.16 | −1.77 | 1.78 | 264.87 |
| $Ca_{0.5}MnO_y$ | Brown | 54.89 | 6.29 | −1.62 | 6.49 | 345.55 |
| $BaMnO_y$ | Brown | 58.45 | 2.58 | 10.35 | 10.67 | 76.02 |
| $Sr_2MnO_y$ | Green | 57.06 | −2.07 | 1.34 | 2.47 | 147.00 |
| $Ba_2MnO_y$ | Green | 57.17 | −1.59 | 3.92 | 4.23 | 112.10 |
| $(Sr,Ca,Ba)_2MnO_y$ | Green | 57.51 | −2.81 | 2.73 | 3.92 | 135.85 |

It is also possible to produce pigments through substitution of magnesium into pigments such as those listed in Table 1. For example, 4 wt % MgO was added into each alkaline earth-manganese oxide listed in Table 1. The resulting 10 pigments, as set forth in Table 5, were not appreciably different in color (compare Tables 3 and 5) and were still IR reflecting (e.g., greater than 50% reflectance at 1,100 nm).

TABLE 5

Color Values (Masstone, Mg-doped pigments)

| Chemistry | Color | $L^*$ | $a^*$ | $b^*$ | $C^*$ | h |
|---|---|---|---|---|---|---|
| $Ca_2MnO_y$ | Black | 28.22 | 1.58 | 0.98 | 1.86 | 31.86 |
| $SrMnO_y$ | Black | 27.87 | 1.51 | −0.51 | 1.59 | 341.36 |
| $Ca_{0.5}MnO_y$ | Brown | 30.24 | 5.93 | 1.21 | 6.05 | 11.49 |
| $BaMnO_y$ | Brown | 36.80 | 4.50 | 14.87 | 15.54 | 73.18 |
| $Sr_2MnO_y$ | Green | 32.69 | −0.22 | 5.02 | 5.03 | 92.51 |
| $Ba_2MnO_y$ | Green | 33.69 | −0.87 | 6.02 | 6.02 | 98.27 |

It is also possible to produce pigments through substitution of non-alkaline earth metals. For example, the addition of 4 wt % $TiO_2$ into $Ba_2MnO_y$ yields a pigment that is still green and IR reflecting. The addition of 4.5 wt % $V_2O_5$ into $Sr_2MnO_y$ yields a pigment that is still green and IR reflecting. The addition of 2 wt % $ZrO_2$ into $BaMnO_y$ yields a pigment that is still brown and IR reflecting.

It is apparent that substitutions into these compositions can be made to enhance or otherwise modify their properties. Various dopants can be added in sufficient amounts such that they do not significantly adversely affect the performance of the pigment. Typically, the total amount of such dopants does not exceed 30 mol percent of the alkaline earth metal or manganese. These dopants include elements from Groups I-A, III-A, IV-A, V-A, VI-A, VII-A, VIII-A, I-B, II-B, III-B, IV-B, V-B, VI-B, VIII-B, the Lanthanide elements, and the Actinide elements of the Periodic Table.

The alkaline earth-manganese oxide pigments of the present invention may be formed by processes such as calcination techniques, sol-gel techniques, spray pyrolysis and/or chemical precipitation. Calcination is a particularly preferred process for making the present alkaline earth-manganese oxide pigments. Typically, the raw materials are oxides of the alkaline earths and of manganese, or compounds that will yield the desired oxides upon calcation. For example, manganese may be supplied as manganese dioxide or as manganese sesquioxide. Alternatively, manganese sulfate, carbonate or hydroxide are among the acceptable choices because, upon calcination, manganese oxide will result from calcining these raw materials.

The weight ratio of alkaline earth oxide or other alkaline earth compound to manganese oxide or other manganese compound is selected to produce the desired composition upon calcination. Mixing of the raw material should be sufficient to assure good physical contact between the different compounds present in order to assure good reaction during the calcination. This may be accomplished, for example, by grinding in a pebble mill either with or without the addition of water. It may also be adequate to hammer mill a simple mixture of the compounds present, or to mix them in a mortar and pestle.

The mixed powders are preferably calcined at temperatures of from about 500 to about 1,500° C., more preferably from about 900 to about 1,300° C. Calcination times of from about 1 to about 60 hours are preferred, more preferably from about 2 to about 12 hours. In a preferred embodiment, the mixture is loaded into a refractory crucible which is capable of withstanding the reaction temperature. An acceptable refractory will not react with the alkaline earth-manganese oxide composition, nor will it melt at the reaction temperature. The crucible can be heated in an electric or gas fired furnace or kiln, but any other method may be chosen if the method will heat the material to the necessary temperature for reaction. A peak temperature, as required by the composition, is preferably reached and maintained for a time as short as one half hour or as long as 16 hours or more. For example, a time of 4 to 6 hours may represent a good compromise between complete reaction and economy of manufacture. The calcination process may optionally include the loss or gain of oxygen in order to maintain electroneutrality.

After the starting oxides or compounds are mixed and heated or calcined, they are cooled, ground and dried if necessary. Grinding is typically required in order to reduce the particle size and finish of the pigment. An air mill is the preferred method of particle size reduction, but a pebble or ball mill, attrition mill or other type of grinding device may be used. After grinding, the alkaline earth-manganese oxide pigments preferably have average particle sizes of from about 0.1 to about 20 microns, more preferably from about 0.5 to about 5 microns.

As a particular example, to produce a strontium manganese oxide pigment of the formula $SrMnO_y$, 1 mol of manganese dioxide may be mixed with 1 mol of strontium oxide (as strontium carbonate) and calcined at 1,200° C. for 4 hours. After cooling the material is charged in a pebble mill and ground to a particle size of 0.5 to 10 microns, preferably about 2.5 microns. The ground strontium-manganese oxide material is washed, dewatered, dried and dispersed. A black pigment with acceptably high infrared reflectance results. This process can be applied to other alkaline earth manganese oxide pigments, such as those listed in Table 6.

TABLE 6

Figure 2:
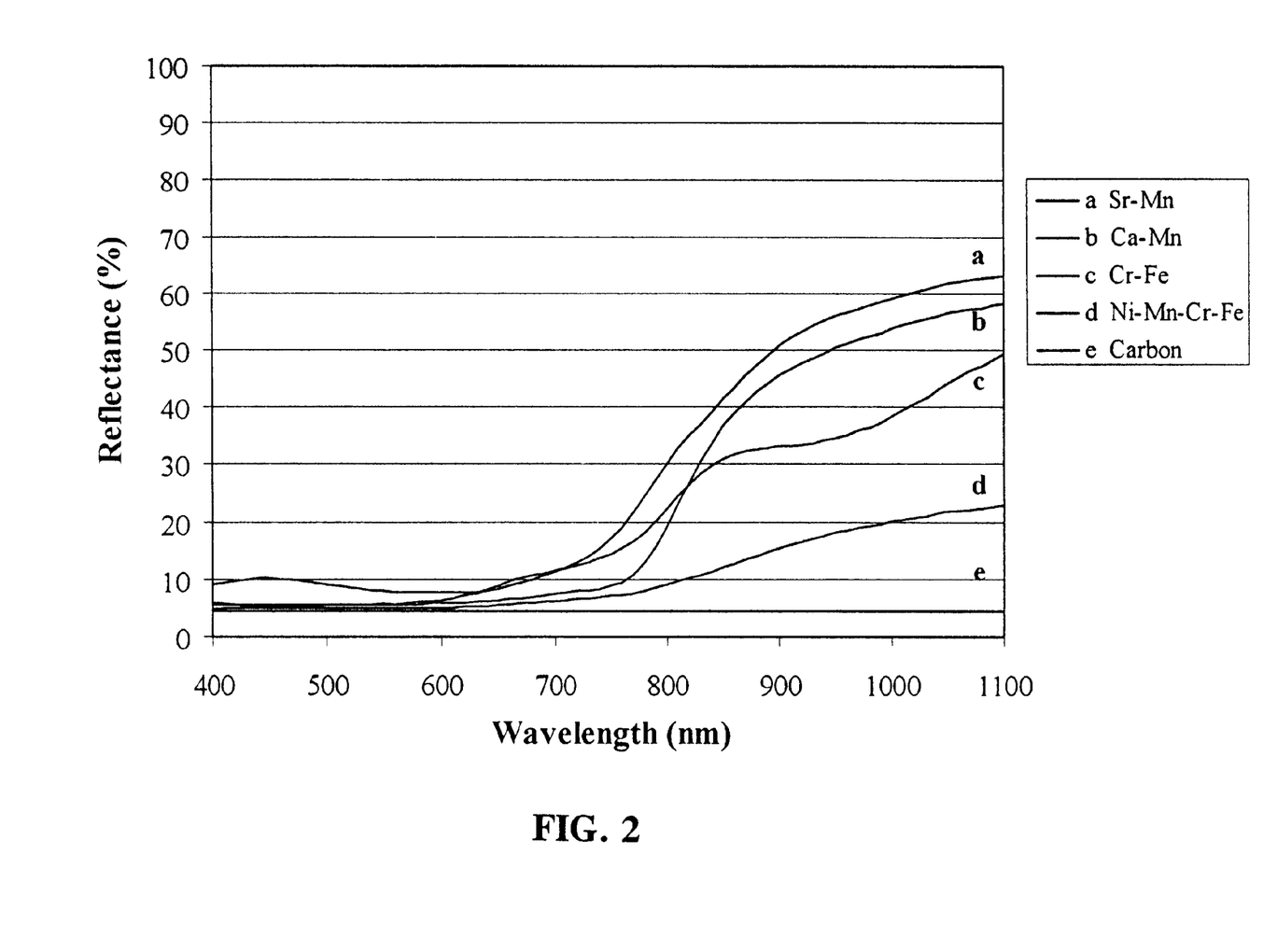
FIG. 2 is a graph illustrating masstone visible and infrared reflectance characteristics for black Sr—Mn—O and Ca—Mn—O pigments of the present invention in comparison with conventional Cr—Fe—O, Ni—Mn—Cr—Fe—O and carbon black pigments.
Figure 3:
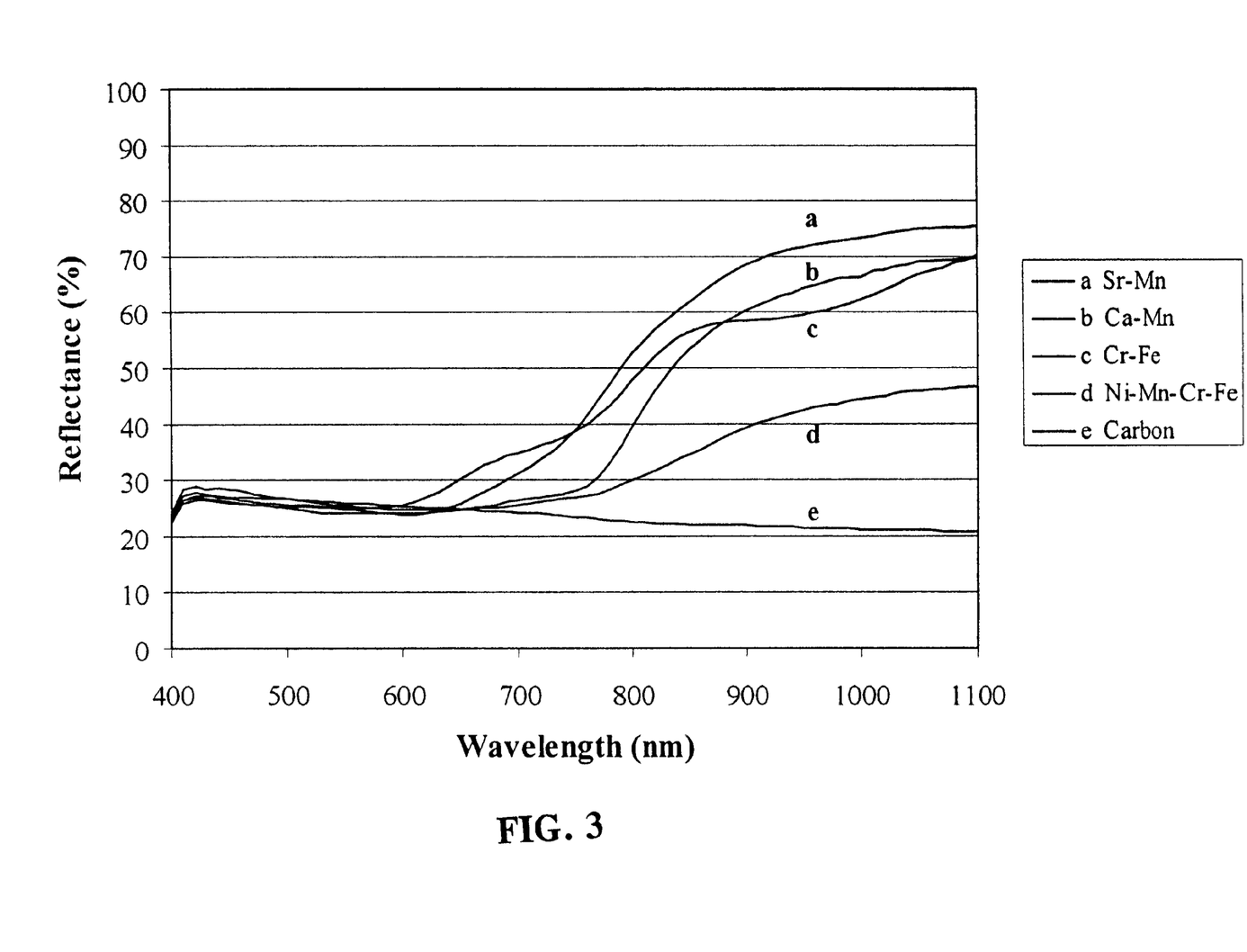
FIG. 3 is a graph illustrating tint visible and infrared reflectance characteristics for black Sr—Mn—O and Ca—Mn—O pigments of the present invention in comparison with conventional Cr—Fe—O, Ni—Mn—Cr—Fe—O and carbon black pigments.
Figure 4:
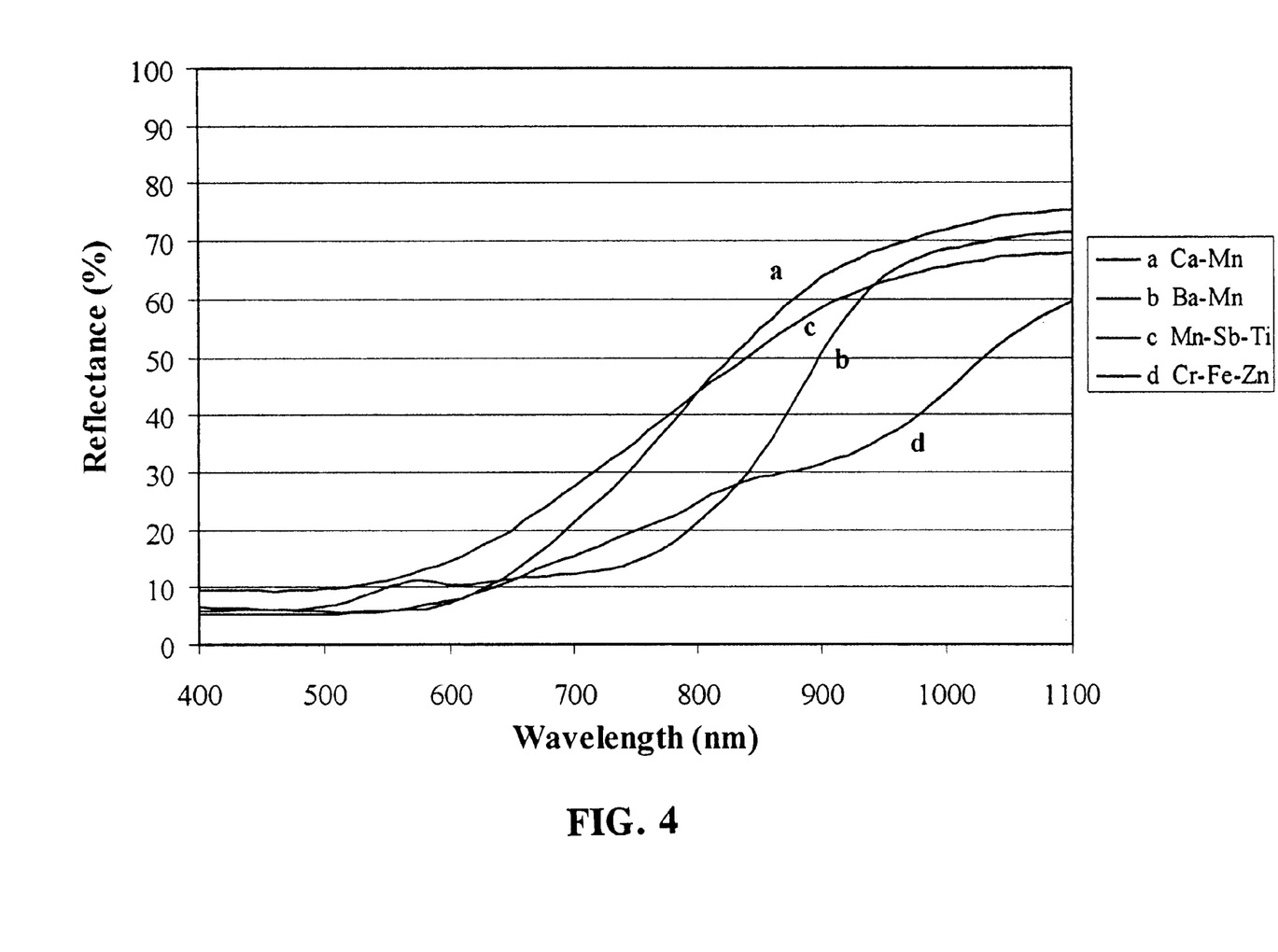
FIG. 4 is a graph illustrating masstone visible and infrared reflectance characteristics for brown Ca—Mn—O and Ba—Mn—O pigments of the present invention in comparison with conventional Mn—Sb—Ti—O and Cr—Fe—Zn—O pigments.
Figure 5:
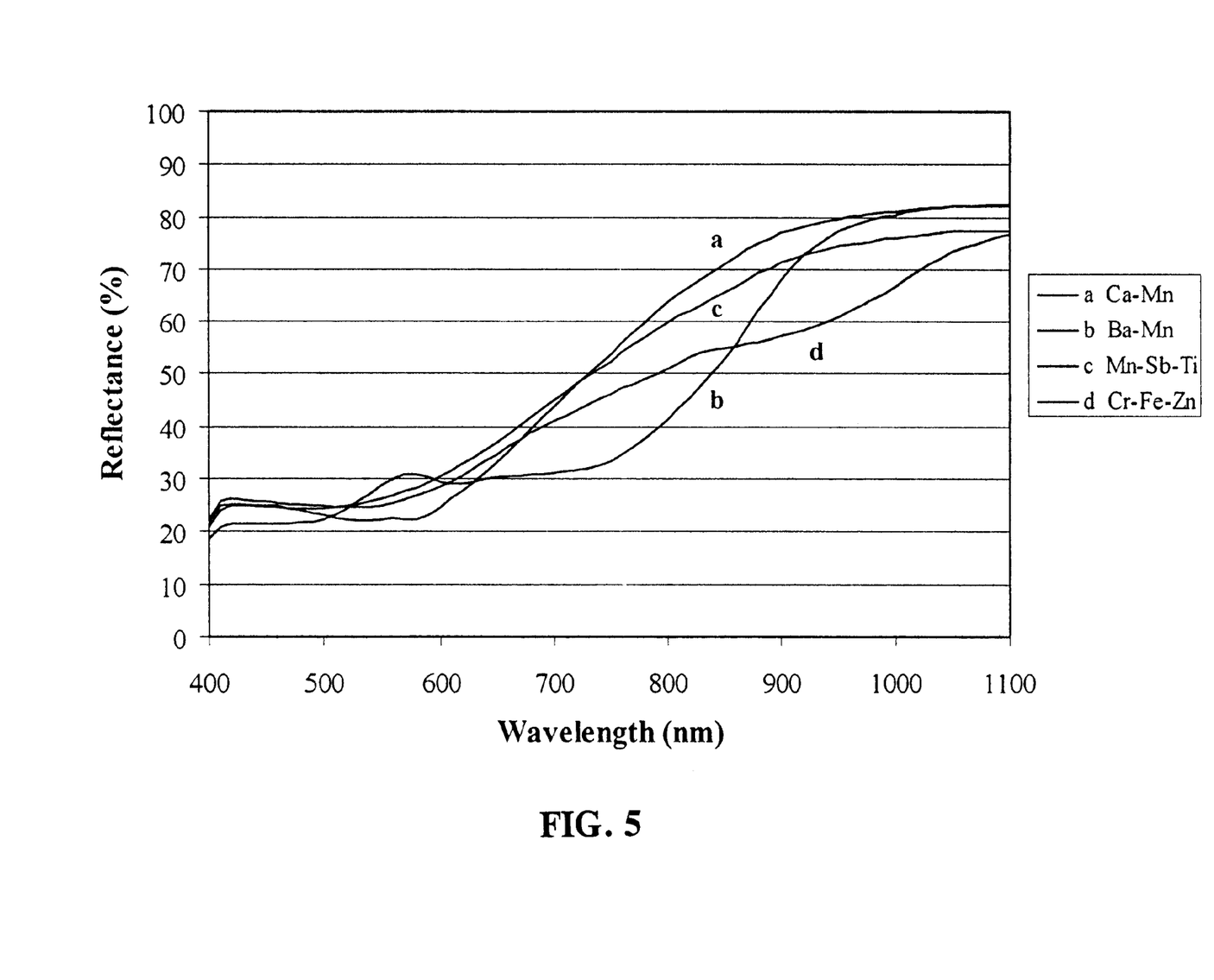
FIG. 5 is a graph illustrating tint visible and infrared reflectance characteristics for brown Ca—Mn—O and Ba—Mn—O pigments of the present invention in comparison with conventional Mn—Sb—Ti—O and Cr—Fe—Zn—O pigments.
Figure 6:
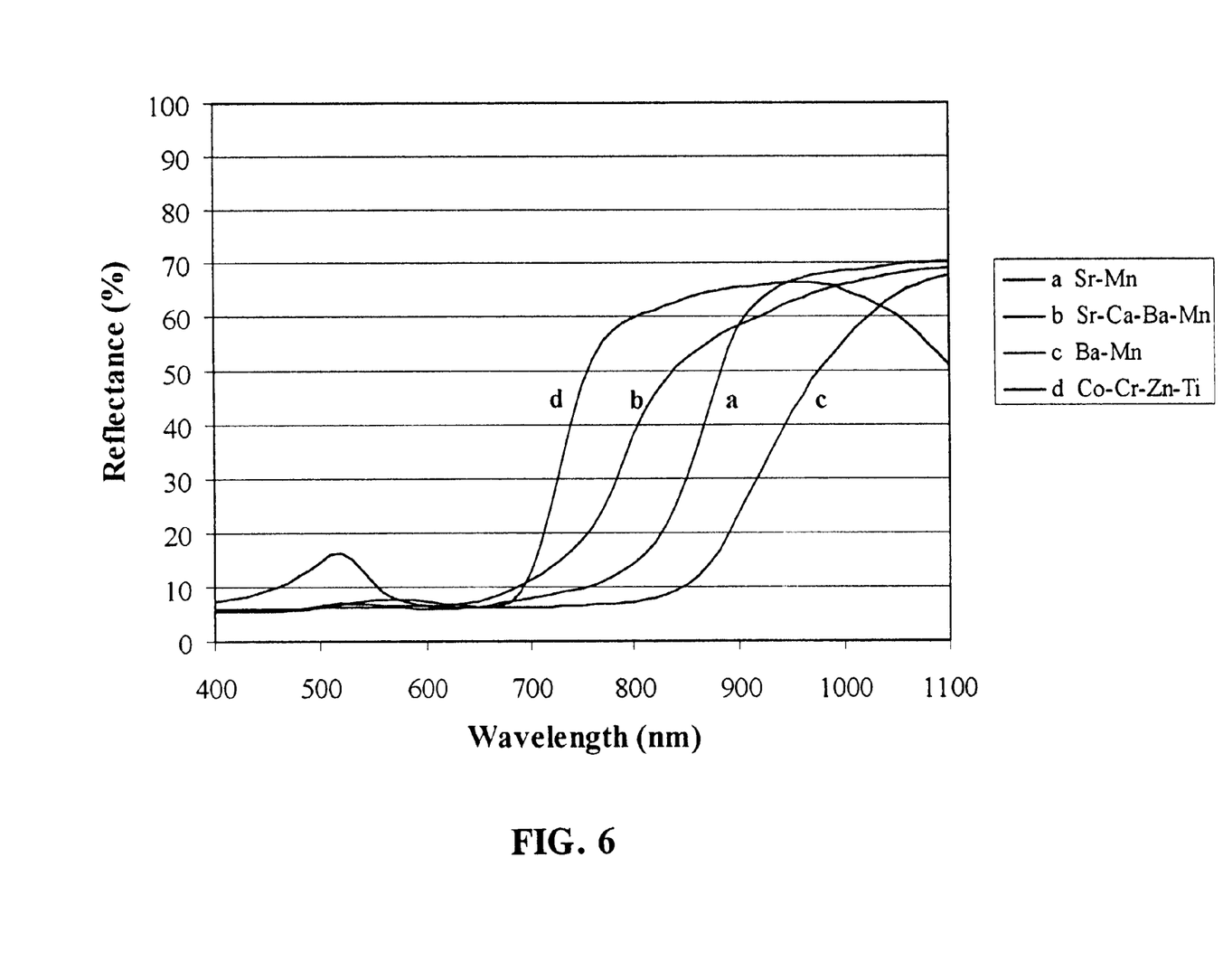
FIG. 6 is a graph illustrating masstone visible and infrared reflectance characteristics for green Sr—Mn—O, Ca—Sr—Ba—Mn—O and Ba—Mn—O pigments of the present invention in comparison with a conventional Co—Cr—Zn—Ti—O pigment.
Figure 7:
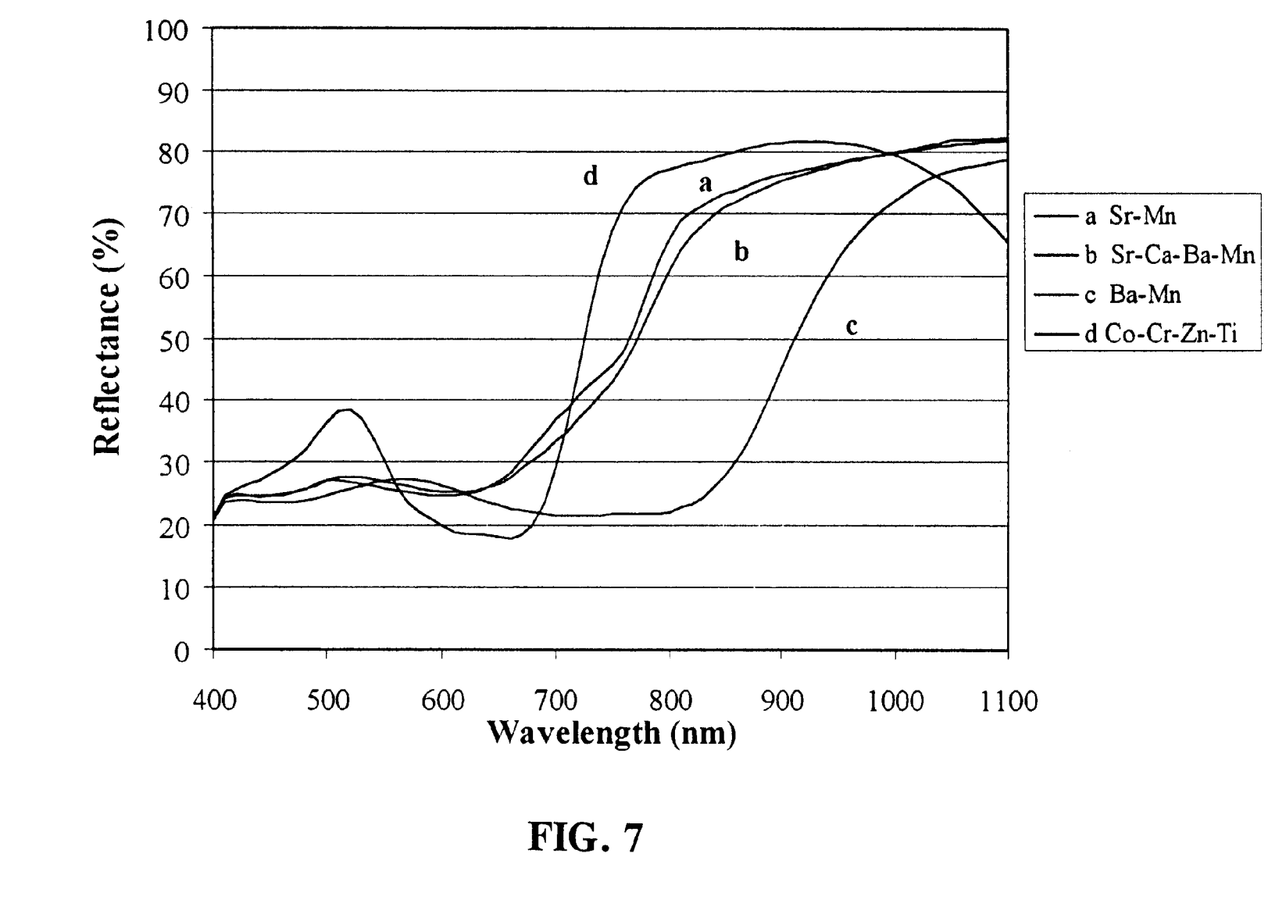
FIG. 7 is a graph illustrating tint visible and infrared reflectance characteristics for green Sr—Mn—O, Ca—Sr—Ba—Mn—O and Ba—Mn—O pigments of the present invention in comparison with a conventional Co—Cr—Zn—Ti—O pigment.

| Chemistry | Color | Mol alkaline earth per 1 mol Manganese | Calcine Temp. | IR Spectra |
|---|---|---|---|---|
| $SrMnO_y$ | Black | 1.0 | 1,200° C. | FIGS. 2 and 3 |
| $Ca_2MnO_y$ | Black | 2.2 | 1,100° C. | FIGS. 2 and 3 |
| $Ca_{0.5}MnO_y$ | Red-Brown | 0.5 | 1,200° C. | FIGS. 4 and 5 |
| $BaMnO_y$ | Yellow-Brown | 1.0 | 1,100° C. | FIGS. 4 and 5 |
| $Sr_2MnO_y$ | Green | 2.0 | 1,100° C. | FIGS. 6 and 7 |
| $Ba_2MnO_y$ | Green | 1.8 | 1,100° C. | FIGS. 6 and 7 |

The alkaline earth-manganese oxide pigments of the present invention may be used in many applications such as automotive and marine paints, and colored plastics such as vinyl siding. One advantageous property in these applications is the high IR reflection exhibited by the pigments. This property allows the pigments to develop the desired color in the visible range, while reflecting a large amount of the IR radiation outside of this visible range. This means that the surface of objects colored with the present IR reflective pigments remain cooler under solar radiation than those not colored with IR reflective pigments. The reflectance properties of materials incorporating the present pigments are preferably higher at IR wavelengths compared to visible wavelengths (400–700 nm). The IR wavelengths include near-IR (700–2,000 nm), mid-IR (2,000–4,000 nm), and far-IR (4,000–5,500 nm). The use of the present alkaline earth-manganese oxide pigments may provide improved IR reflectance characteristics at some or all of these wavelengths. The alkaline earth manganese oxide pigments exhibit much less heat buildup and much higher infrared radiation reflectance in comparison to conventional colorants that yield a similar color.

Plastic, rubber, paint and other compositions incorporating the present pigments may possess improved IR reflectance properties. Also, various types of substrates may be coated with the present pigments, such as wood, glass, ceramic, metal, plastic and composite substrates to provide an organic coating or paint which provides improved IR reflectance and low heat buildup properties.

FIGS. 2–7 illustrate improved IR reflectance characteristics achieved with the present alkaline earth-manganese pigments in comparison with conventional pigments. The masstone samples shown in FIGS. 2, 4 and 6 were made and tested by adding 2 g pigment to 70 g polyvinyl carbide (PVC). The pigment was dispersed within the PVC at 420° F. on a two-roll mill. The tint samples shown in FIGS. 3, 5 and 7 were made and tested by adding 2 g pigment to 70 g PVC containing 10 wt % titania. The reflectance curves of these tint samples were measured to determine the relative strength of each pigment. A second series of tint samples were then prepared, adjusting the pigment loading such that each sample had a comparable strength, or value of reflection in the visible range.

As illustrated in FIGS. 2–7, materials colored with the present alkaline earth-manganese oxide pigments have similar optical reflectance curves in the visible spectrum in comparison with conventional colorants, but possess markedly increased reflectance characteristics in the IR region at wavelengths up to 1,100 nm and higher. These reflectance characteristics are highly advantageous in applications where darker colors are preferred and heat buildup due to the absorption of IR radiation is to be minimized.

Figure 8:
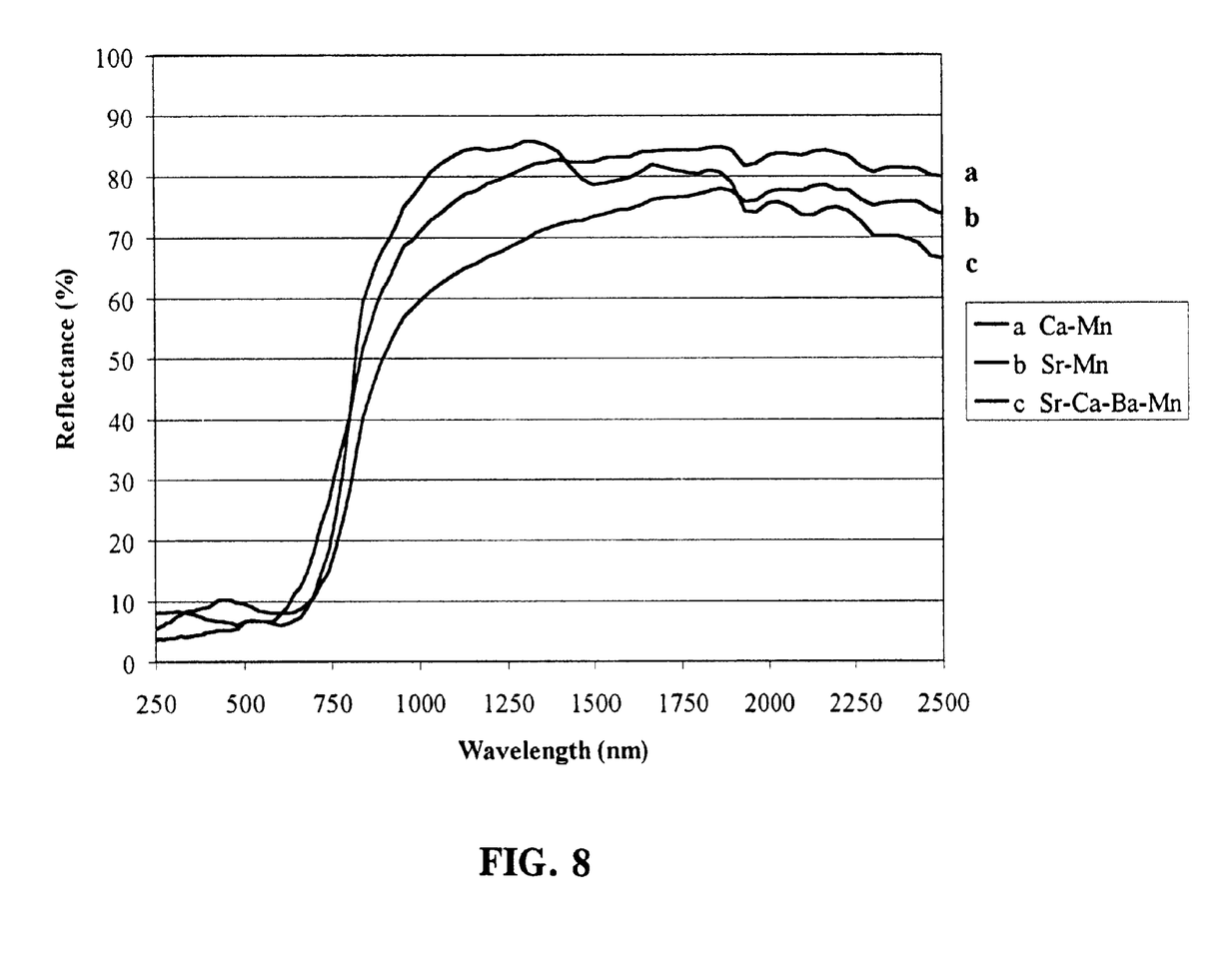
FIG. 8 is a graph illustrating masstone visible and infrared reflectance characteristics at wavelengths of up to 2,500 nm for Ca—Mn—O, Sr—Mn—O and Ca—Sr—Ba—Mn—O pigments in paint applications in accordance with the present invention.

The alkaline earth-manganese oxide pigments of the present invention also preferably exhibit increased IR reflectances at wavelengths of up to 2,500 nm and higher, as demonstrated in FIG. 8. Specifically, FIG. 8 illustrates visible and infrared reflectance characteristics at wavelengths of up to 2,500 nm for Ca—Mn—O, Sr—Mn—O and Ca—Sr—Ba—Mn—O pigments of the present invention.

Pigments such as those shown in FIGS. 2–8 with IR reflectances of, for example, greater than 50% at 1,100 nm will generally perform well in heat buildup tests. Thermal energy from solar radiation is absorbed at wavelengths of up to about 2,500 nm. Table 8 contains data for samples that were tested for heat buildup using ASTM Method 4803. The samples containing Sr—Mn—O, Ca—Mn—O and Ba—Mn—O black pigments of the present invention are more than 40° F. cooler than conventional carbon black. There is a similar trend for the green pigments in which the present alkaline earth-manganate green pigments are all 40° F. cooler than the conventional carbon black.

TABLE 8

Infrared Radiation Induced Heat Buildup

| Chemistry | Color | Max T (° F.) | ** Heat build-up (° F.) Difference |
|---|---|---|---|
| Carbon Standard | Black | 215.0 | — |
| Sr—Mn | Black | 159.4 | −55.6 |
| Ca—Mn | Black | 171.1 | −43.9 |
| Ni—Mn—Cr—Fe | Black | 190.2 | −24.8 |
| Co—Cr—Fe | Black | 196.3 | −18.7 |
| Ca—Mn | Brown | 164.7 | −50.3 |
| Sr—Mn | Green | 164.6 | −50.4 |
| Ba—Mn | Green | 171.2 | −43.8 |
| Co—Cr—Zn—Ti | Green | 197.4 | −17.6 |

* Samples run at 2.86 PPH
**Maximum Carbon Black Temp minus Maximum R&D Temp

As shown in Table 8, samples comprising the alkaline earth-manganese oxide pigments of the present invention exhibit substantially decreased heat buildup when subjected to IR radiation in comparison with commercially available carbon black, Ni—Mn—Cr—Fe, Co—Cr—Fe and Co—Cr—Zn—Ti pigments. The ability of the present pigments to reduce IR-induced heat buildup has particular significance for uses such as architectural, automotive, military, aerospace, industrial and electronics applications.

The pigments of the present invention may be used as colorants for various types of materials. Plastic or rubber compositions to which the alkaline earth-manganese oxide pigments may be added in accordance with this invention include polymeric materials that are natural or synthetic. Examples include natural resins, rubber, chlororubber, casein, oil-modified alkyd resins, viscose, cellulose acetate, cellulose propionate, cellulose acetobutyrate, nitrocellulose, or other cellulose ethers or esters. Synthetic organic polymers produce by polymerization, polyaddition, or polycondensation in thermosetting or thermoplastics can also be colored by this invention. Examples are polyethylene, polystyrene, polypropylene, polyisobutylene, polyvinylchloride, polyvinylacetate, polyacrylonitrile, poly acrylic acid, other polyolefins and substituted polyolefins, as well as methacrylic acid esters, butadiene, as well as copolymers of the above mentioned. Examples from polyaddition and polycondensation resins are the condensation products of formaldehyde with phenols, phenolic resins, urea, thiourea, and melamine, amino resins, polyesters, polyamides, polycarbonates, and/or silicones. These polymers can be present individually or as mixtures as plastic material or melts spun into fibers. They can also be dissolved as film formers or binders for lacquers, paints, or printing inks such as linseed oil, nitrocellulose, melamine resins, acrylic resins, ureaformaldehyde resins and the like.

The present alkaline earth-manganese oxide pigments may also be provided in liquid or paste form. Suitable liquid carriers for the alkaline earth-manganese oxide pigments include pine oils, vegetable oils, mineral oils, low molecular weight petroleum fractions, tridecyl alcohols, synthetic resins and natural resins. When used in paints for architectural, automotive, marine and other applications, the alkaline earth-manganese oxide pigment preferably comprises from about 0.1 to about 50 weight percent of the liquid paint composition, more preferably from about 1 to about 30 weight percent. For example, latex architectural paints preferably comprise from about 0.5 to about 50 weight percent of the alkaline earth-manganese oxide pigments, with the remainder of the paint comprising water, resin and solvents. Oil-based paints preferably comprise from about 0.5 to about 50 weight percent of the present alkaline earth-manganese oxide pigments, with the remainder comprising organic solvents, resins and additives.

The present pigments provide good colorant properties as well as several other advantages over conventional pigments. As described above, one of the reasons that the present alkaline earth manganese oxide pigments are advantageous is that their IR reflectance is higher than conventional pigments. Typical black or dark colored colorants for the plastics industry are based on either carbon black, hematite Cr—Fe based blacks, or spinel blacks formulated with Ni—Mn—Cu—Fe—Cr. In plastics applications with solar exposure, carbon black pigments absorb light not only in the visible range, but also into the infrared region. This leads to higher temperatures on the exposed color surface, which may cause additional energy costs, or premature failure or degradation of the exposed part. Conventional Cu—Cr oxide pigment compositions, which may contain other additives, do not perform much better than the carbon blacks.

Another advantage of the present alkaline earth manganese oxide pigments is based upon their chemistry. Typical colorants for the glass and ceramic industry may contain copper, nickel, cobalt or chromium in their formulations. When glasses decorated with these pigments are recycled, the aforementioned elements impart objectionable color or physical properties to the recycled glass. Manganese and alkaline earth metals, on the other hand, do not impart such objectionable characteristics in recycled materials. Therefore, due to more stringent recycling efforts, these colorants may be used where traditional colorants are not suitable.

Furthermore, the present pigments are formed from low cost, easily obtainable starting materials, which makes them commercially attractive in comparison with conventional pigments such as cobalt and transition metal pigments currently in use.

Whereas particular embodiments of this invention have been described above for purposes of illustration, it will be evident to those skilled in the art that numerous variations of the details of the present invention may be made without departing from the invention as defined in the appended claims.

What is claimed is:

1. A pigment comprising alkaline earth-manganese oxide of the formula $Me_xMnO_y$, where Me is at least one metal selected from Ca, Sr, Ba and Mg, x is from 0.01 to 99, and y is greater than or equal to x+1 and less than or equal to x+2 and designates the number of oxygen atoms required to maintain electro neutrality, wherein the pigment exhibits infrared reflectance of greater than 50 percent at at least one wavelength within the range of from 1,100 nm to 2,500 nm, and resists heat buildup when subjected to infrared radiation.

2. The pigment of claim 1, wherein x is from 0.08 to 12.

3. The pigment of claim 1, wherein x is from 0.25 to 4.

4. The pigment of claim 1, wherein the alkaline earth-manganese oxide comprises $Me_2MnO_4$, where Me is at least one metal selected from the group consisting of Ca, Sr and Ba.

5. The pigment of claim 1, further comprising at least one dopant including at least one element selected from the group consisting of groups I-A, III-A, IV-A, V-A, VII-A, VIII-A, I-B, II-B, III-B, IV-B, V-B, VI-B, VIII-B, the Lanthanide elements, and the Actinide elements of the Periodic Table.

6. The pigment of claim 1, wherein the pigment consists essentially of an alkaline earth-manganese oxide of the formula $Me_xMnO_y$ and the pigment is a black, brown or green color.

7. A coating composition comprising:
a liquid carrier; and
a pigment comprising alkaline earth-manganese oxide dispersed in the carrier, wherein the alkaline earth-manganese oxide is of the formula $Me_xMnO_y$, where Me is at least one metal selected from the group consisting of Ca, Sr, Ba and Mg, x is from 0.01 to 99, and y is greater than or equal to x+1 and less than of equal to x+2, and wherein the coating composition resists heat buildup when subjected to infrared radiation and exhibits infrared reflectance of greater than 50 percent at at least one wavelength within the range of from 1,100 nm to 2,500 nm.

8. The coating composition of claim 7, wherein the pigment consists essentially of an alkaline earth-manganese oxide of the formula $Me_xMnO_y$ and the pigment is from about 0.1 to about 50 weight percent of the coating composition.

9. The coating composition of claim 7, wherein the liquid carrier comprises at least one solvent selected from pine oils, vegetable oils, mineral oils, synthetic resins and natural resins.

10. An article comprising:
a substrate matrix; and
a pigment comprising alkaline earth-manganese oxide dispersed in the substrate matrix, wherein the alkaline earth-manganese oxide is of the formula $Me_xMnO_y$, where Me is at least one metal selected from the group consisting of Ca, Sr, Ba and Mg, x is from 0.01 to 99, and y is greater than or equal to x+1 and less than or equal to x+2, and wherein the article resists heat buildup when subjected to infrared radiation and exhibits infrared reflectances of greater than 50 percent at at least one wavelength within the range of from 1,100 nm to 2,500 nm.

11. The article of claim 10, wherein pigment consists essentially of alkaline earth-manganese oxide of the formula $Me_xMnO_y$ and the article resists heat buildup when subjected to infrared radiation.

12. An article comprising:
a substrate; and
a coating including a pigment consisting essentially of alkaline earth-manganese oxide covering at least a portion of the substrate, wherein the the alkaline earth-manganese oxide is of the formula $Me_xMnO_y$, where Me is at least one metal selected from the group consisting of Ca, Sr, Ba, and Mg, x is from 0.01 to 99, and y is greater than or equal to x+1 and less than or equal to x+2, and wherein the article resists heat buildup when subjected to infrared radiation and exhibits infrared reflectance of greater than 50 percent at at least one wavelength within the range of from 1,100 nm to 2,500 nm.

13. The article of claim 12, wherein the substrate comprises glass, ceramic, metal, plastic, carbon or composite.

* * * * *